United States Patent
Tanemura et al.

(10) Patent No.: US 11,353,561 B2
(45) Date of Patent: Jun. 7, 2022

(54) DISTANCE MEASURING SENSOR

(71) Applicant: DENSO CORPORATION, Kariya (JP)

(72) Inventors: Tomoki Tanemura, Kariya (JP); Koichi Oyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 890 days.

(21) Appl. No.: 16/175,901

(22) Filed: Oct. 31, 2018

(65) Prior Publication Data

US 2019/0154810 A1  May 23, 2019

(30) Foreign Application Priority Data

Nov. 17, 2017 (JP) .............................. JP2017-222194

(51) Int. Cl.
*G01S 7/481* (2006.01)
*G01S 17/34* (2020.01)

(52) U.S. Cl.
CPC .......... *G01S 7/4818* (2013.01); *G01S 7/4817* (2013.01); *G01S 17/34* (2020.01)

(58) Field of Classification Search
CPC ....... G01S 7/4817; G01S 7/4818; G01S 17/34
See application file for complete search history.

(56) References Cited

U.S. PATENT DOCUMENTS

| | | | |
|---|---|---|---|
| 2007/0181810 A1 | 8/2007 | Tan et al. | |
| 2014/0376001 A1* | 12/2014 | Swanson | G01N 21/17 356/479 |
| 2015/0222089 A1 | 8/2015 | Jeong | |
| 2015/0288148 A1 | 10/2015 | Takabayashi | |
| 2017/0219695 A1 | 8/2017 | Hall et al. | |
| 2018/0306925 A1* | 10/2018 | Hosseini | G02B 27/283 |
| 2019/0056482 A1* | 2/2019 | Nagai | G01S 7/4815 |

FOREIGN PATENT DOCUMENTS

| | | | |
|---|---|---|---|
| EP | 2395368 A1 * | 12/2011 | ............. G01S 7/484 |
| JP | 07-066383 A | 3/1995 | |
| JP | 2001-324563 A | 11/2001 | |

(Continued)

OTHER PUBLICATIONS

EP-2395368-A1 (Year: 2011).*

(Continued)

*Primary Examiner* — Luke D Ratcliffe
*Assistant Examiner* — Sanjida Naser
(74) *Attorney, Agent, or Firm* — Posz Law Group, PLC

(57) ABSTRACT

A distance measuring sensor includes: a light source having a semiconductor optical amplifier and a resonator with a silicon photonic circuit, which are at a semiconductor substrate; a plurality of emitters, each emitter configured to emit a light beam generated by the light source to outside of the light source; a scanner configured to perform scanning with the light beam by enabling the light beam emitted from the light source to be reflected at a mirror and vibrating the mirror; an optical receiver configured to receive a reflected light beam, which is generated by the light beam reflected at the object; and a processor configured to measure the distance to the object based on the reflected light beam received at the optical receiver. Light beams respectively emitted from the emitters are incident on the mirror in different directions. The scanner performs scanning different regions with the respective light beams.

13 Claims, 7 Drawing Sheets

(56) References Cited

FOREIGN PATENT DOCUMENTS

| | | |
|---|---|---|
| JP | 2002-005614 A | 1/2002 |
| JP | 2004-157065 A | 6/2004 |
| JP | 2004-517352 A | 6/2004 |
| JP | 2009-135312 A | 6/2009 |
| JP | 2016-146417 A | 8/2016 |
| JP | 2017-175009 A | 9/2017 |
| WO | 02/37166 A1 | 5/2002 |
| WO | 2017/126386 A1 | 7/2017 |

OTHER PUBLICATIONS

Testa et al., "Design and Implementation of an Integrated Reconfigurable Silicon Photonics Switch Matrix in IRIS Project", IEEE Journal of Selected Topics in Quantum Electronics, vol. 22, No. 6, Nov./Dec. 2016.

Press Release (Oct. 23, 2015), Kyushu University (with partial translation).

\* cited by examiner

DISTANCE MEASURING SENSOR

CROSS REFERENCE TO RELATED APPLICATION

This application is based on Japanese Patent Application No. 2017-222194 filed on Nov. 17, 2017, the disclosure of which is incorporated herein by reference.

TECHNICAL FIELD

The present disclosure relates to a distance measuring sensor.

BACKGROUND

LIDAR (Light Detection and Ranging) has been used for detecting, for example, the distance to an object by using a laser. Additionally, LIDAR, which is mounted to a vehicle, has been demanded to perform scanning with a wider angle.

For example, JP 2004-517352 A discloses a distance measuring sensor including two light sources respectively having optical fibers. The distance measuring sensor uses two lights respectively generated by the two light sources to irradiate a mirror. The two lights are emitted from two different directions. Subsequently, two different light beams reflected from the mirror respectively illuminate different regions. This type of distance measuring sensor is possible to illuminate a region with light about twice the usual width of one mirror whose range of motion is limited.

SUMMARY

Since the flexibility of LIDAR's mounting place in a vehicle is important, the miniaturization of a device and wide-angle scanning have been demanded. However, in a situation where (i) two light sources having optical fibers are prepared as described in JP 2004-517352 A, or (ii) a fiber for transmitting light from the light source is branched to different parts in order to irradiate the mirror with the respective lights emitted in two different directions; as a result, the physical size of the optical system has to be enlarged, and hence it results in higher manufacturing cost.

It is an object of the present disclosure to provide a distance measuring sensor configured to enlarge the illumination region scanned with a light beam without enlarging the physical size of the sensor.

According to an aspect of the present disclosure, a distance measuring sensor is configured to measure a distance to an object with light transmission and light reception.

The distance measuring sensor includes a light source, a plurality of emitters, a scanner, an optical receiver and a processor.

The light source has: a semiconductor optical amplifier at a semiconductor substrate; and a resonator with a silicon photonic circuit at the semiconductor substrate.

The scanner is configured to perform scanning with the light beam by enabling the light beam emitted from the light source to be reflected at a mirror and vibrating the mirror.

The optical receiver is configured to receive a reflected light beam, which is generated by the light beam reflected at the object.

The processor configured to measure the distance to the object based on the reflected light beam received at the optical receiver.

Light beams respectively emitted from the emitters are incident on the mirror in different directions, and the scanner performs scanning different regions with the respective light beams.

Accordingly, since the light source includes the semiconductor optical amplifier and the resonator having a silicon photonics circuit, the light source can be configured on a single semiconductor substrate. Hence, it is possible to reduce the physical size of the light source.

As a result, it is possible to reduce the physical size of the distance measuring sensor by irradiating the mirror with the light beams emitted in multiple directions so as to scan a wider region with the light beams.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
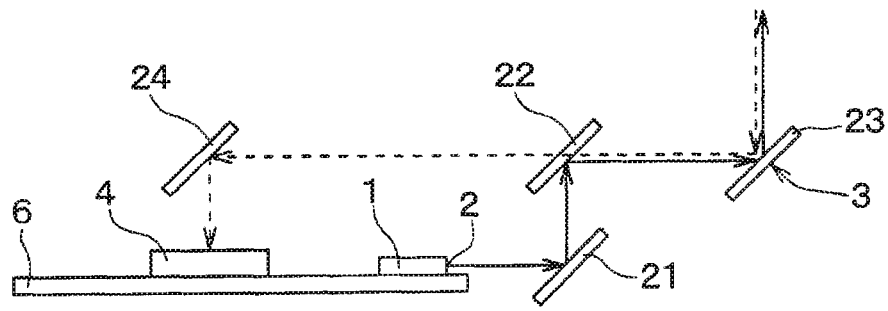
FIG. 1 illustrates the configuration of a distance measuring sensor according to a first embodiment.

The following describes several embodiments with reference to the drawings. In the following embodiments, the same or equivalent parts are denoted by the same reference numerals as each other, and explanations will be provided to the same reference numerals.

First Embodiment

The following describes the first embodiment. A distance measuring sensor according to the present embodiment is mounted to a vehicle, and it is configured to measure the distance between a vehicle and an object through light transmission and light reception. This specification describes the Frequency Modulated Continuous Wave (hereinafter referred to as "FMCW") distance measuring sensor that calculates a distance to an object through a heterodyne detection, which combines the transmitted light beam and received light beam and examines the frequency difference.

Figure 2:
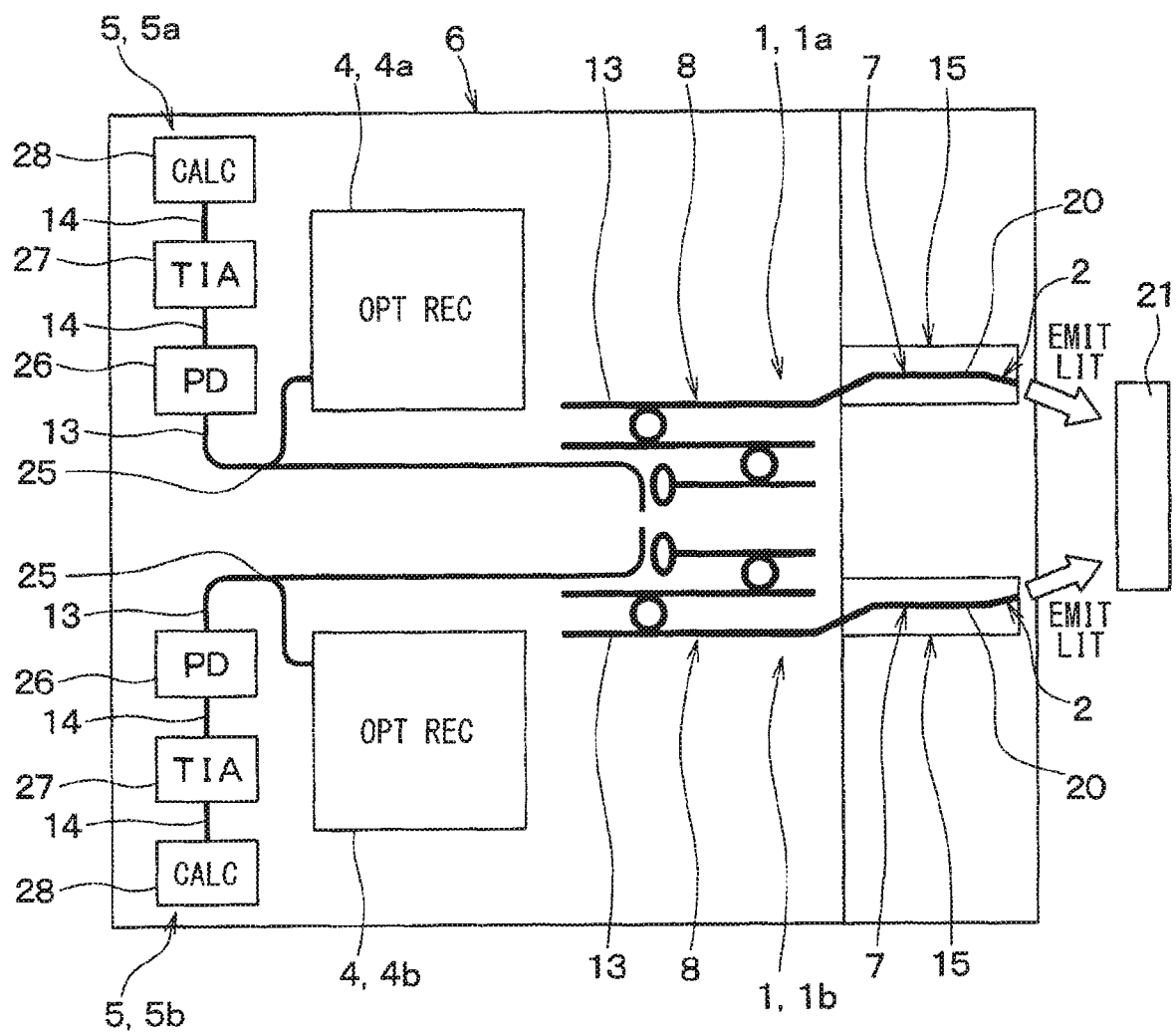
FIG. 2 is a plan view of the configuration of the distance measuring sensor according to the first embodiment.

As shown in FIGS. 1 and 2, the distance measuring sensor includes: a light source 1; an emitter 2 configured to emit the light generated by the light source 1 to outside of the light source 1; and a scanner 3 configured to perform scanning with the light beam emitted from the emitter 2. The distance measuring sensor further includes: an optical receiver 4 configured to receive the light beam from outside; and a processor 5 configured to measure the distance to an object based on the light beam received at the optical receiver 4.

FIG. 2 illustrates that the light source 1 includes: a semiconductor optical amplifier (hereinafter referred to as "SOA") 7 arranged at the semiconductor substrate 6; and a resonator 8 having a silicon photonic circuit formed on the semiconductor substrate 6. The distance measuring sensor according to the present embodiment has two light sources 1. In other words, the distance measuring sensor has two SOAs 7 and two resonators 8.

Figure 3:
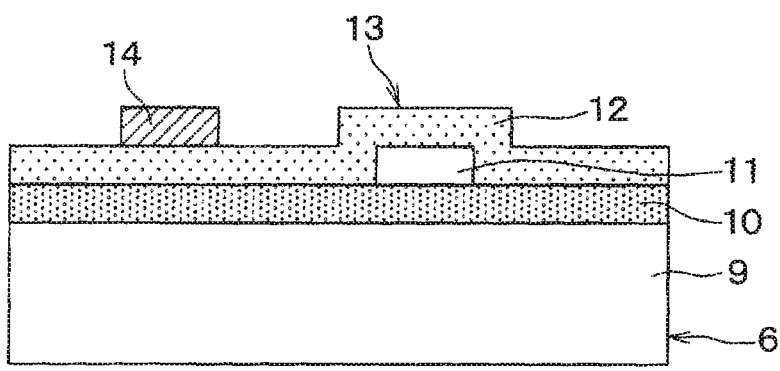
FIG. 3 is a cross sectional view of a semiconductor substrate.

FIG. 3 illustrates that the semiconductor substrate 6 is configured as a silicon-on-insulator (hereinafter referred to as "SOI") substrate where a supporting layer 9, a sacrificial layer 10 and an active layer 11 are stacked in order. The supporting layer 9 is made of Si. The sacrificial layer 10 is made of SiO2. The active layer 11 is made of Si.

One portion of the active layer 11 is removed by etching. An insulating film 12 made of SiO2 covers the active layer 11 and an exposed portion of the sacrificial layer 10. One portion of the sacrificial layer 10 is exposed due to the removal of the active layer 11. An optical waveguide 13 is configured by the active layer 11, the sacrificial layer 10 and the insulating film 12.

The active layer 11 is configured as a core layer of the optical waveguide 13, and the sacrificial layer 10 and the insulating film 12 around the active layer 11 are configured as a cladding layer of the optical waveguide 13. The optical waveguide 13 corresponds to a substrate-side optical waveguide disposed closer to the semiconductor substrate 6 than to a chip 15.

A wiring 14 is arranged at the surface of the insulating film 12. The wiring is made of, for example, Al. The wiring 14 is configured to make mutual connections among a plurality of configuration elements in the processor 5, and to make a connection between the distance measuring sensor and, for example, a power source (not shown).

The present embodiment describes that: the core layer of the optical waveguide 13 is made of Si; and the cladding layer of the optical waveguide 13 is made of SiO2. However, these layers may also be made of other materials. It is preferable that the core layer of the optical waveguide 13 is made of Si or at least one material selected from SiO2, SiN, SiON, LN and InP doped with impurities.

It is also preferable that the cladding layer is made of at least one material selected from SiO2, SiN, SiON, LN and InGaAsP. However, the core layer is made of material different from the material made for the cladding layer.

Figure 4:
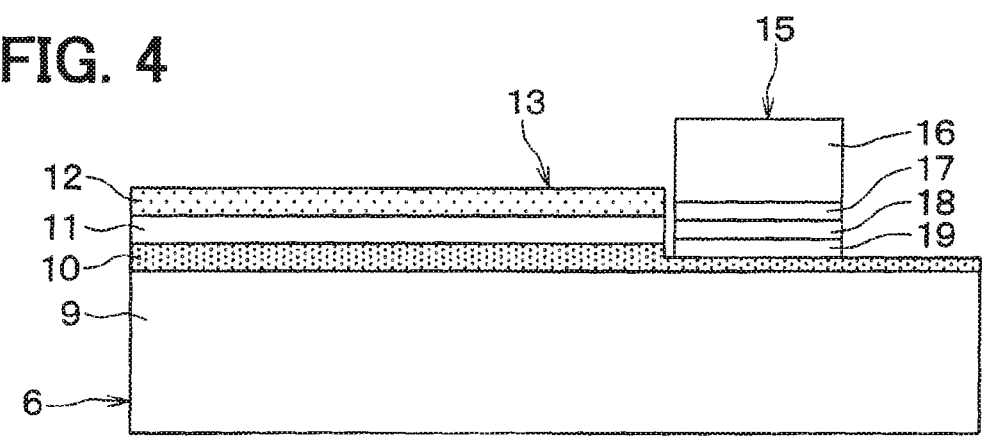
FIG. 4 is cross section view of the semiconductor substrate and a chip illustrated in FIG. 2.

FIG. 2 illustrates that the distance measuring sensor includes two chips 15 respectively for the two SOAs 7. As shown in FIG. 4, the chip 15 is configured by stacking the cladding layer 17, the core layer 18 and the cladding layer 19 on the semiconductor substrate 6 in order. The cladding layer 19 is placed on the top of the semiconductor substrate 6 so that the cladding layer 19 is placed below the cladding layer 17 and the core layer 18.

One portion of the core layer 18 is removed by etching. The core layer 18 and the cladding layer 17, which is exposed by the removal of the core layer 18, are covered by the cladding layer 19. An optical waveguide 20 is formed in a shape coupling with one end of the chip 15 and the other end of the chip 15 as shown in FIG. 2. The optical waveguide 20 corresponds to a chip-side optical waveguide disposed closer to the chip 15 than to the semiconductor substrate 6. The core layer 18 is made of a III-V group semiconductor such as InGaAsP or InGaAlAs.

As shown in FIG. 4, one portion of the active layer 11, the sacrificial layer 10 and the supporting layer 9 are removed at one end of the semiconductor substrate 6. The cladding layer 19 is stacked on the top of the supporting layer 9. The end surface of the active layer 11 is opposite to the end surface of the core layer 18. The light emitted from the optical waveguide 13 is incident on the optical waveguide 20. Or alternatively, the light emitted from the optical waveguide 20 is incident on the optical waveguide 13.

FIG. 2 illustrates that the resonator 8 is an optical ring resonator configured by the optical waveguide 13. A part of the light beam generated by the SOA 7 is emitted from the optical waveguide 13 and is incident on the optical waveguide 20 of the chip 15 and then returns to the SOA 7, after the resonator 8 adjusts the wavelength and frequency band of the light beam.

The other part of the light beam is coupled with an optical signal output from the optical receiver 4 to form a combination wave to be input to the processor after the resonator 8 adjusts the wavelength and frequency band of the light beam.

The light beam, which is transmitted back to the SOA 7 from the resonator 8, is emitted to outside the chip 15 from the emitter 2. The emitter 2 is configured at one end portion of the optical waveguide 20, which is opposite to the other end portion of the optical waveguide 20 closer to the optical waveguide 13. The light beam emitted from the emitter 2 is incident on a scan mirror 23 in the scanner 3 after the light beam is reflected from a fixed mirror 21 and a semitransparent mirror 22 as indicated by a solid arrow in FIG. 1.

As mentioned above, the distance measuring sensor according to the present embodiment includes two chips 15, which are respectively for the two SOAs 7, and two resonators 8. One part of the light beam generated by each SOA 7 is emitted from the emitter 2 formed on each chip 15 after returning to the SOA 7 from each resonator 8.

The present embodiment provides two light sources 1 and two emitters 2. The light beam generated by one of the light sources 1 is emitted from one of the emitters 2. The light beam generated by the other light source 1 is emitted from the other emitter 2.

As shown in FIG. 2, one of the two optical waveguides 20 is tilted with respect to the other one of the two optical waveguides 20 at a location where a part of the optical waveguide 20 is configured as the emitter 2.

The emitted light beam from one of the emitters 2 is incident on the fixed mirror 21 such that the emitted light beam from one of the emitters 2 is tilted with respect to the light beam emitted from the other one of the emitters 2. Therefore, the two emitted light beams are incident on the scan mirror 23 in different directions.

Figure 5:
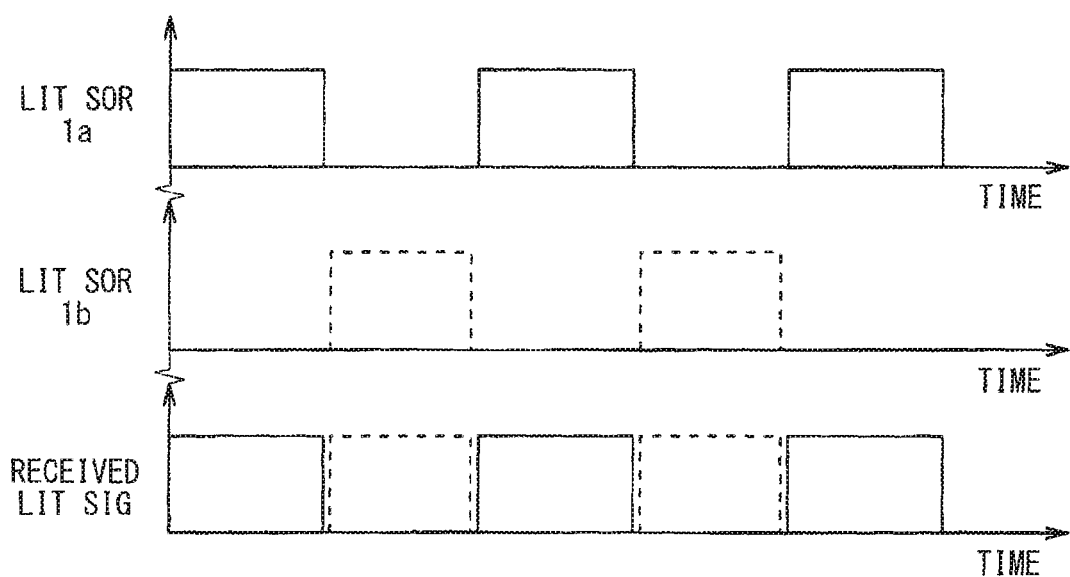
FIG. 5 illustrates two light sources' timing for emitting light and an optical receiver's timing for receiving light.

In the present embodiment, one of the two emitters 2 emits a light beam at timing different from the timing during which the other one of the two emitters 2 emits a light beam. In other words, as the two light sources 1 are denoted as a light source 1a and a light source 1b, the light sources 1a and 1b generate the light alternately as illustrated in FIG. 5.

As a result, the optical receiver 4 alternately receives the reflected light of the light beam generated by the light source 1a and the reflected light of the light beam generated by the light source 1b.

In the present embodiment, the light sources 1a and 1b change the frequency of the generated light though time. For example, the waveform of the frequency of the light beam generated by the light source 1a is a triangular wave that repetitively rises and falls between frequencies fA0 and fA1.

Similarly, the waveform of the frequency of the light beam generated by the light source 1b is a triangular wave that repetitively rises and falls between frequencies fB0 and fB1. The time duration of light-emitting at the light sources 1a or 1b is, for example, a single cycle of a triangular wave.

The scanner 3 includes the scan mirror 23 and a driver (not shown). The light beam, which is emitted from the emitter 2, is reflected at the scan mirror 23. The driver vibrates the scan mirror 23 to perform scanning with the light beam.

The scan mirror 23 may be, for example, a Micro Electromechanical Systems (hereinafter referred to as "MEMS") mirror or a voice coil mirror whose coil is driven by an electromagnet. The scan mirror 23 in vibration reflects the light beam to carry out two-dimensional scanning or one-dimensional scanning.

As described above, the lights respectively from the two emitters 2 are incident on the scan mirror 23 in different directions. The scanning region scanned with the light beam emitted from the one of the emitters 2 is different from the scanning region scanned with the light beam emitted from the other one of the emitters 2.

Figure 6:
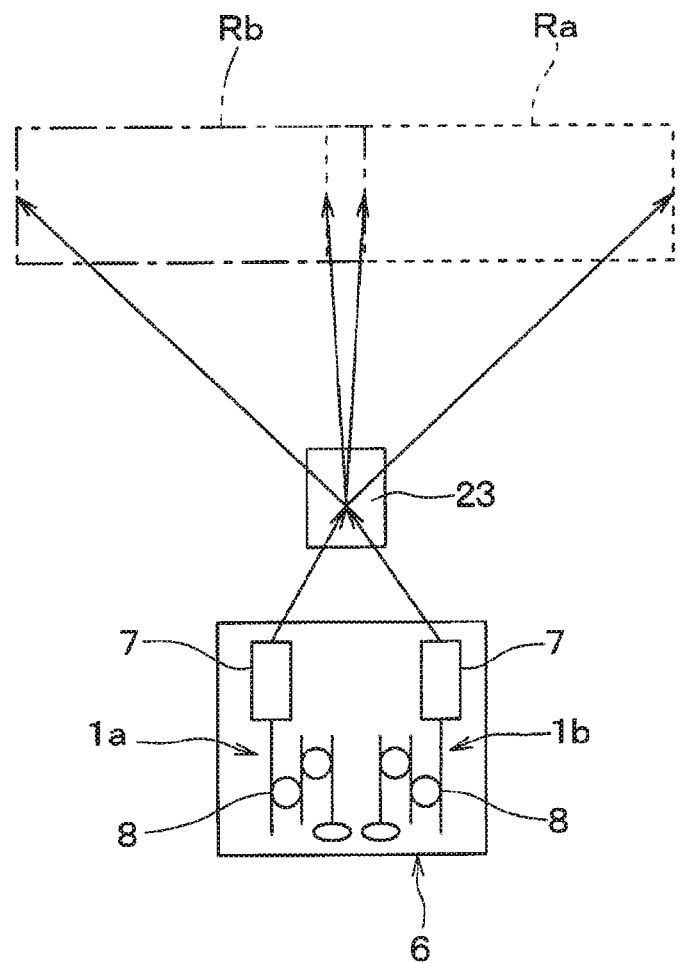
FIG. 6 illustrates the scanning regions with the lights respectively generated by two light sources.

The scanning region scanned with the light beam generated by the light source 1a is indicated as the scanning region Ra, and the scanning region scanned with the light beam generated by the light source 1b is indicated as the scanning region Rb. Both of the scanning regions Ra and Rb are formed in a rectangular shape indicated in, for example, FIG. 6. FIG. 6 illustrates that one part of the scanning region Ra overlaps with one part of the scanning region Rb. As compared with the situation where the scanning is performed only in one of the scanning regions Ra and Rb, the scanning region is wider in the situation where the scanning is performed in both of the scanning regions Ra and Rb. It is noted that FIG. 6 omits the illustration of, for example, the fixed mirror 21 and the semitransparent mirror 22.

The light beam which is reflected from an object in the scanning region Ra or Rb is indicated by a dashed-line in FIG. 1. The light is incident on the scan mirror 23 and then passes through the semitransparent mirror 22. Subsequently, the light beam is reflected at the fixed mirror 24 and is incident on the optical receiver 4.

The optical receiver 4 may be, for example, a diffraction grating configured by the optical waveguide 13. FIG. 2 illustrates that the optical waveguide 13, which is connected to the optical receiver 4, and the optical waveguide 13, which is connected to the resonator 8, join together and forms an optical multiplexer 25. The optical signals respectively from the optical receiver 4 and the resonator 8 are coupled at the optical multiplexer 25, and then the coupled signal is input to the processor 5.

The processor 5 includes a photodiode (hereinafter referred to as "PD") 26, a trans-impedance amplifier (hereinafter referred to as "TIA") 27, and a calculator 28. The processor 5 according to the present embodiment measures the distance to an object and the speed of the object with a frequency modulated continuous wave.

The PD 26 converts an optical signal to an electrical signal. The optical signal is input to the PD 26. The PD 26 is connected to the optical multiplexer 25 through the optical waveguide 13. The optical signal generated at the optical multiplexer 25 is input to the PD 26.

The PD 26 may be, for example, a PIN photodiode. The PD 26 outputs a current signal based on the input optical signal. The PD 26 may be an avalanche photodiode. The PD 26 is connected to the TIA 27 through the wiring 14. The current signal output from the PD 26 is input to the TIA 27.

The TIA 27 converts the current signal input from the PD 26 to a voltage signal and then outputs the voltage signal. The TIA 27 is connected to the calculator 28 through the wiring 14. The voltage signal output from the TIA 27 is input to the calculator 28.

The calculator 28 processes the electrical signal, which is input to the calculator 28. The calculator 28 calculates, for example, a distance to an object through a heterodyne detection. In particular, the calculator 28 converts the electrical signal, which is output from the TIA 27, to a digital signal. The calculator 28 detects a frequency component included in the digital signal through Fast Fourier Transform (hereinafter referred to as "FFT"). Subsequently, the calculator 28 calculates the distance to an object and the speed of the object based on the frequency component.

The calculator 28 identifies the emitter 2, which outputs a light beam used for measuring the distance to an object. The calculator 28 obtains an angle of the scan mirror 23, and detects the direction of the object based on the angle and the distance. The calculator 28 subsequently uses a calculation result of, for example, the distance to an object, and a detection result of the direction of the object to produce a two-dimensional data or a one-dimensional data.

The two-dimensional data is produced when the scanner 3 performs the two-dimensional scanning. The one-dimensional data is produced when the scanner 3 performs the one-dimensional scanning. The data produced by the calculator 28 is transmitted to, for example, an ECU (not shown) mounted to a vehicle, and the data is applied to, for example, automatic braking for avoiding a contact with an object.

FIG. 2 illustrates that the distance measuring sensor according to the present embodiment has two processors 5. The two processors 5 are respectively connected to the light sources 1a and 1b through the optical multiplexer 25. The two processors 5 are denoted as the processors 5a and 5b. The processor 5a is connected to the light source 1a, and the processor 5b is connected to the light source 1b.

The distance measuring sensor includes two optical receivers 4. The two optical receivers 4 are denoted as optical receivers 4a and 4b. The processors 5a and 5b are respectively connected to the optical receivers 4a and 4b through the optical waveguide and the optical multiplexer 25.

Each processor 5 then identifies the emitter 2, which outputs the light beam, based on the timing during which the optical receiver 4 has been receiving the light beam. In particular, the calculator 28 in the processor 5a detects a beat frequency based on the light beam received at the optical receiver 4 and the light beam generated by the light source 1 according to an optical signal input to the PD in the timing during which the light source 1a has been emitting the light beam.

Accordingly, the distance to an object and the speed of the object are calculated based on the beat frequency. Additionally, the calculator 28 in the processor 5b detects a beat frequency based on the light beam received at the optical receiver 4 and the light beam generated by the light source 1 according to an optical signal input to the PD in the timing during which the light source 1b has been emitting light. Accordingly, the distance to an object and the speed of the object are calculated based on the beat frequency.

The above describes the configuration of the distance measuring sensor according to the present embodiment. The SOA 7, PD 26, TIA 27 and calculator 28 are connected to an external control circuit through wiring (not shown), and are in operation based on an electrical signal input from the control circuit.

The following describes the operation of the distance measuring sensor according to the present embodiment. When the light beam is generated by the SOA 7 in the light source 1, the SOA 7 inputs an optical signal to the resonator 8. The resonator 8 adjusts the wavelength and frequency band of the optical signal input from the SOA 7, and outputs the adjusted signal to the SOA 7 and PD 26.

The light beam, which is transmitted back to the SOA 7 from the resonator 8, is emitted from the emitter 2 configured at the optical waveguide 20. The light beam is reflected at the mixed mirror 21, the semitransparent mirror 22 and the scan mirror 23, and then is irradiated to outside a vehicle.

The light sources 1a and 1b generate the light beam alternately based on an electrical signal input from outside. The two light beams respectively generated by the light sources 1a and 1b are irradiated to the scan mirror 23 in different directions. Different scanning regions are respectively scanned with the two light beams.

The light beam radiated to outside the vehicle is reflected at an object located outside the vehicle, and then is incident on the scan mirror 23. Subsequently, the reflected light beam passes through the semitransparent mirror 22 and is reflected at the fixed mirror 24, and then is incident on the two optical receivers 4.

The light beam received at the optical receiver 4 is coupled with the light beam from the resonator 8 through the optical multiplexer 25. The optical signal generated at the optical multiplexer 25 is converted to a current signal through the PD 26, and is further converted to a voltage signal through the TIA 27 and then input to the calculator 28.

The calculator 28 converts an input signal to a digital signal, and detects the frequency component of the digital signal through FFT. The calculator 28 then calculates the distance to an object and the speed of the object based on the detected frequency component.

The calculator 28 in the processor 5a calculates the distance to an object based on the beat frequency during the timing in which the light source 1a emits the light beam. Similarly, the calculator 28 in the processor 5b calculates the distance to an object based on the bit frequency during the timing in which the light source 1b emits the light beam.

The calculator 28 transmits the calculated result to, for example, an ECU (not shown). In a situation where an object exists within a predetermined distance, the automatic braking or the like is in operation for avoiding a contact with the object.

The following describes the effects of the present embodiment. The present embodiment describes that the light source 1 includes the SOA 7 and the resonator 8 having a silicon photonics circuit. Since the SOA 7 and the resonator 8 are arranged on the top of one semiconductor substrate 6, the light source 1 is miniaturized. Even if the distance measuring sensor is configured to emit the light beams to the scan mirror 23 respectively in two different directions, there is no need to enlarge the physical size of the distance measuring sensor.

The system can be complicated when the number of light sources is increased in an FMCW-LIDAR in which one part of light generated by the light source is input to the PD. However, in the present embodiment, a circuit, in which the reference light and signal light of a heterodyne detection are coupled, is arranged on the top of one semiconductor substrate 6 by silicon photonics technique. Hence, there is no need to enlarge the physical size of the distance measuring sensor due to a complicated system.

The light beams respectively emitted from the two emitters 2 are incident on the scan mirror 23 in different directions, and the different scanning regions are respectively scanned with the two emitted light beams. Compared with the situation where a scanning region is scanned with one light beam emitted from one emitter, the distance measuring sensor according to the present embodiment is capable of scanning a wider region with two light beams emitted from two emitters.

Since the present embodiment describes that the light source 1, the optical receiver 4, the processor 5 or the like are arranged on one semiconductor substrate 6, it is easier to manufacture the distance measuring sensor as compared with the situation where the above-mentioned components are respectively arranged on different semiconductor substrates.

Since the timing during which the light source 1a emits the light beam is different from the timing during which the light source 1b emits the light beam, the emitter 2, which emits the light beam for measurement, can be recognized when the distance to an object is measured. Therefore, the direction of the object can be detected in higher accuracy.

Two mixed mirrors 21 may be provided so that the light beams respectively emitted from the light sources 1a and 1b are in incident on the scan mirror 23 in different directions based on the respective angles of the two mixed mirror 21.

In the present embodiment, the light beam's incident direction to the scan mirror is adjusted by the angle of the optical waveguide 20, which is configured for the emitter 2. Accordingly, the number of components can be reduced so as to reduce the cost for manufacturing the distance measuring sensor.

Second Embodiment

The following describes a second embodiment. The present embodiment refers to a modification of the configuration of the chip 15 as compared with the first embodiment. Since the other parts in the present embodiment are similar to the ones in the first embodiment, the following only describes the part different from the first embodiment.

Figure 7:
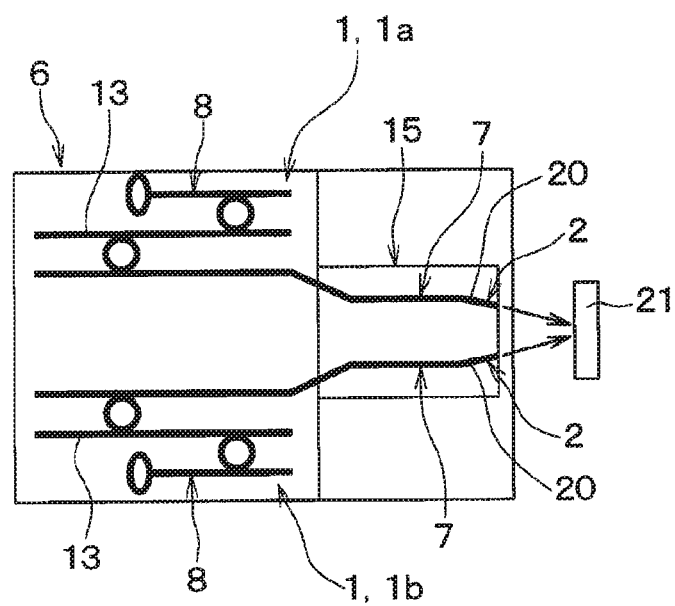
FIG. 7 is a plan view of a distance measuring sensor according to a second embodiment.

FIG. 7 illustrates that a distance measuring sensor according to the present embodiment includes a single chip 15 having two SOAs 7. The two emitters 2 are respectively configured by the two optical waveguides 20 in the single chip 15. It is noted that FIG. 7 omits the illustration of the optical receiver 4, the processor 5 or the like.

Since two SOAs 7 are in the single chip 15, it is possible to reduce the number of the components so as to miniaturize the distance measuring sensor. Accordingly, it is easier to manufacture the distance measuring sensor. Moreover, the cost for manufacturing the distance measuring sensor can be further reduced.

Third Embodiment

The following describes a third embodiment. The present embodiment relates to a modification to the method for recognizing a light source as compared with the first embodiment. Since the other parts in the present embodiment are similar to the ones in the first embodiment, the following only describes the part different from the first embodiment.

The frequency of a light beam emitted from one of the two emitters 2 is different from the frequency of a light beam emitted from the other one of the two emitters 2 in the present embodiment. For example, a difference in order of THz is between fA0, fA1 and fB0, fB1.

Figure 8:
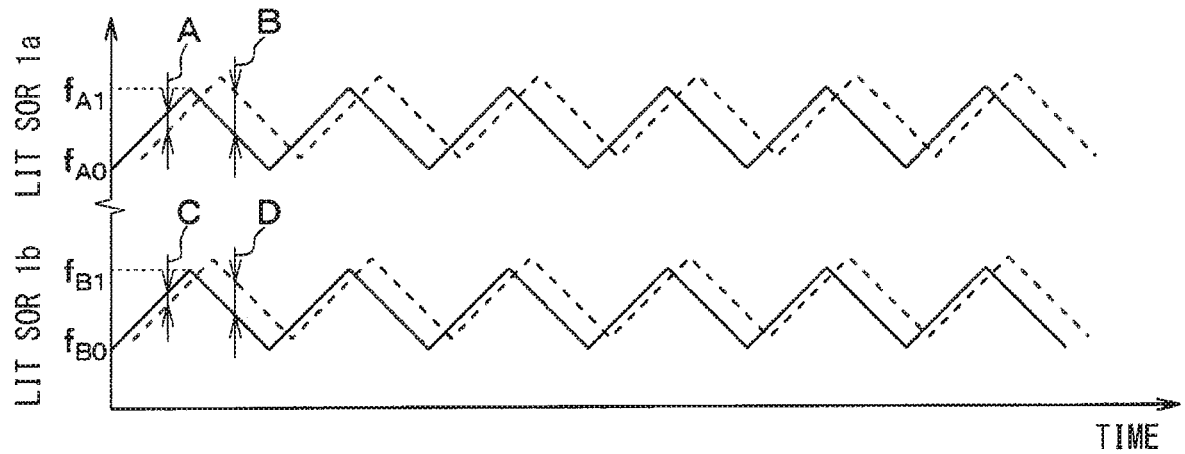
FIG. 8 illustrates a frequency of emitted light in a third embodiment.

By providing the frequency difference, the processor 5 can detect beat frequencies as described in the following. When the light beam emitted from the light source 1a is incident on the optical receiver 4a, the beat frequency equal to or smaller than an order of GHz, for example, about 1 GHz in a heterodyne detection can be detected as indicated by the arrows A and B in FIG. 8. On the other hands, when the light beam emitted from the light source 1b is incident on the optical receiver 4a, the beat frequency is in an order of THz. Since the light beam with this frequency cannot be detected by a typical PD 26, the processor 5a cannot detect the beat frequency.

The processor 5b detects the beat frequency as described in the following. When the light beam generated by the light source 1b is incident on the optical receiver 4b, the beat frequency equal to or smaller than an order of GHz, for example, about 1 GHz is detected in a heterodyne detection as illustrated by the arrows C and D in FIG. 8. On the other hands, when the light beam generated by the light source 1a is incident on the optical receiver 4b, the beat frequency is in an order of THz. Since the light beam with this frequency cannot be detected by a typical PD 26, the processor 5b cannot detect the beat frequency.

By providing a difference of frequencies of the light beams respectively generated by the light sources 1a and 1b, the processor 5 can distinguish the reflected light beams related to the respective light beams emitted by the two emitters based on the detection of a beat frequency. Even when the light sources 1a and 1b emit light beams at the same time, it is possible to detect an object with an improvement in frame rate.

Fourth Embodiment

The following describes a fourth embodiment. The present embodiment refers to a modification of the method for identifying a light source as compared with the first embodiment. Other than that, the present embodiment is similar to the first embodiment. The following only describes the parts of the present embodiment different from the ones of the first embodiment.

In the present embodiment, the polarization direction of the light beam emitted from one of the two emitters 2 is different from the polarization direction of the light beam emitted from the other one of the two emitters 2. The light beam, which is generated by the light source 1a and then is emitted by one of the emitters 2, is a Transverse Electric (hereinafter referred to as "TE") wave.

Figure 9:
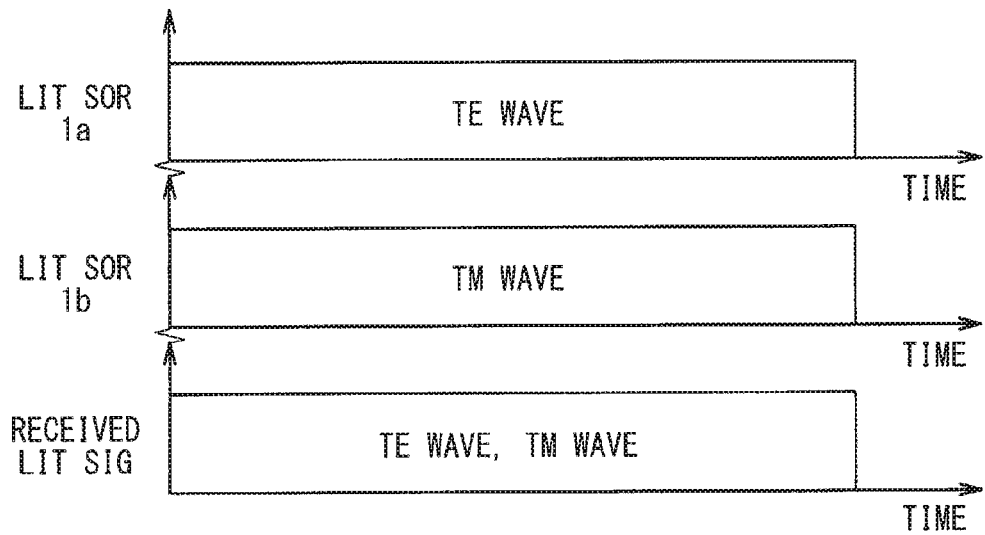
FIG. 9 illustrates a polarization direction of emitted light and a polarization direction of a received light in a fourth embodiment.

The light beam, which is generated by the light source 1b and then is emitted by the other one of the emitters 2, is a Transverse Magnetic (hereinafter referred to as "TM") wave. As shown in FIG. 9, the light sources 1a and 1b generate the light beams at the same time. The light beams respectively generated by the light sources 1a and 1b are incident on the optical receiver 4 at the same time.

Figure 10:
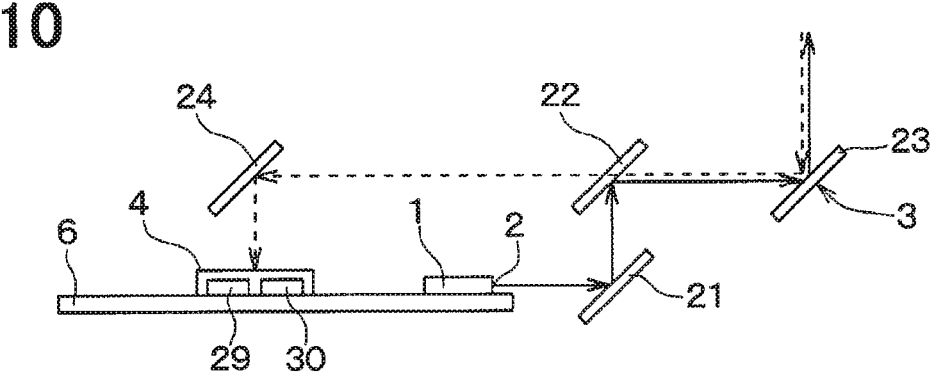
FIG. 10 illustrates the configuration of a distance measuring sensor according to the fourth embodiment.

As shown in FIG. 10, the optical receiver 4 has optical antennas 29 and 30. The optical antenna 29 is configured to receive the light beam having the direction of polarization, which is the same as the direction of polarization of the light beam emitted from one of the emitters 2. The optical antenna 30 is configured to receive the light beam having the direction of polarization, which is the same as the direction of polarization of the light beam emitted from the other one of the emitters 2. In particular, the optical antenna 29 is configured by a diffraction grating where one or more slits are formed to receive a TE wave. The optical antenna 30 is configured by a diffraction grating where one or more slits are formed to receive a TM wave.

The present embodiment provides two semitransparent mirrors 22. Each semitransparent mirror is configured by a polarizing beam splitter (hereinafter referred to as "PBS") for allowing a TE wave to pass through and by another PBS for allowing a TM wave to pass through.

The processor 5 identifies the emitter 2, which emits the light beam, according to the direction of polarization of the light beam received at the optical receiver 4. In particular, the processor 5 includes two PDs 26. One of the PDs 26 receives an optical signal from the optical antenna 29 and the resonator 8. The other one of the PDs 26 receives an optical signal from the optical antenna 30 and the resonator 8. The processor 5 includes two TIAs 27, which corresponds to two PDs 26. The calculator 28 identifies the emitter 2, which emits the light beam to be received at the optical receiver 4, based on an electrical signal from either one of TIAs 27. The electrical signal is input to the calculator 28.

In this embodiment where the light source is identified based on the direction of polarization of the received light beam, the light sources 1a and 1b can emit the light beams at the same time to detect an object. Accordingly, the frame rate can be improved.

Thus, when the polarization properties are utilized, light use efficiency can be enhanced. For example, light use efficiency is equal to 0.5 to the power of 2, that is, 0.25 in the present embodiment in which the light beam generated by the light source 1 passes through the semitransparent mirror 22.

Fifth Embodiment

The following describes a fifth embodiment. The present embodiment refers to a modification of the method for identifying the light source as compared with the first embodiment. Other than that, the present embodiment is similar to the first embodiment. The following only describes the parts of the present embodiment different from the ones of the first embodiment.

Figure 11:
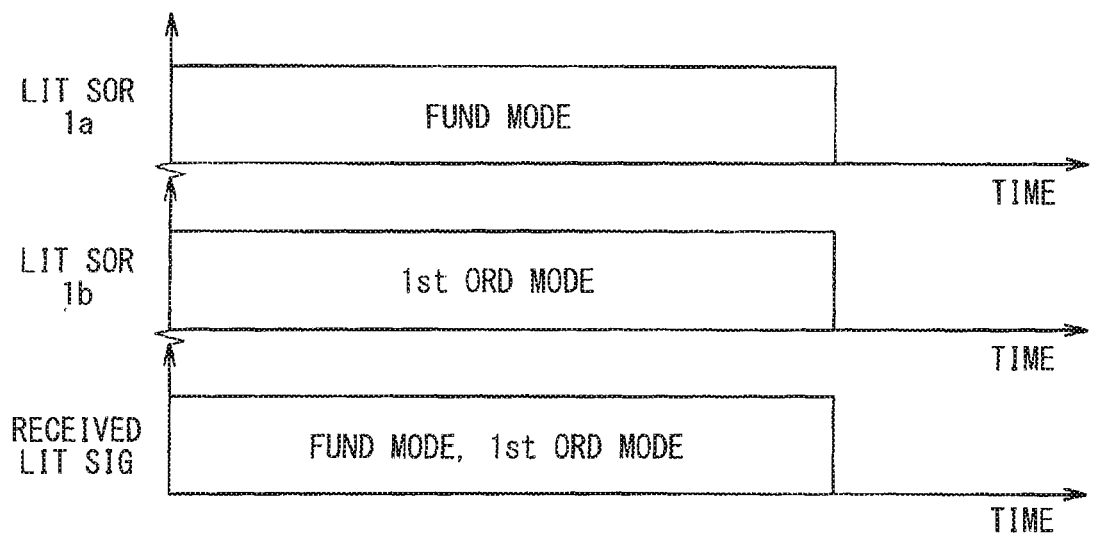
FIG. 11 illustrates the mode of emitted light and the mode of the received light in a fifth embodiment.

In the present embodiment, the mode of the light beam emitted from one of the two emitters 2 is different from the mode of the light beam emitted from the other one of the two emitters 2. In particular, the light beam generated by the light source 1a is emitted in the fundamental mode where the strength is higher at the center portion of the light beam and gets lower toward outer side. Additionally, the light beam generated by the light source 1b is emitted in the first-order mode where there are two peaks of strength. As illustrated in FIG. 11, the light sources 1a and 1b generates the light beams at the same time, and the reflected light of the light beams respectively generated at the light sources are incident on the optical receiver 4 at the same time.

Figure 12:
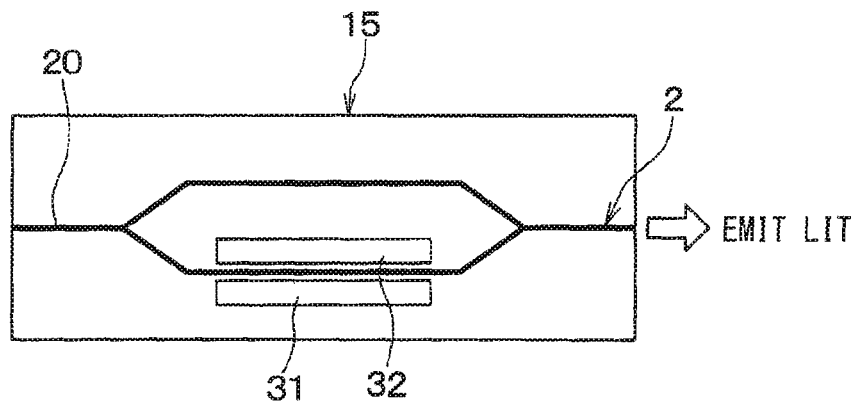
FIG. 12 illustrates a method for controlling the mode of emitted light.

For adjusting the emitted light beam's mode, the optical waveguide 20 between the SOA 7 and the emitter 2 can be configured to allow only a light beam in the fundamental mode to pass through. For the emitter 2 connected to the light source 1b, as illustrated in FIG. 12, one part of the optical waveguide 20 is split into two routes so that the light beam generated by the light source 1b is split into two light beams and then the two light beams are combined into one light beam to be emitted.

The one part of the optical waveguide 20 is split into two routes. Electrodes 31 and 32 are provided so that one of the routes is sandwiched between two electrodes 31 and 32. When a voltage is applied to each of the electrodes 31 and 32, a current flows through the optical waveguide 20 to change a refraction index of the light beam passing through the optical waveguide 20. Thus, the phase of the light beam is inverted. Accordingly, the light beam, which is combined from two split light beams, is in a first-order mode and emitted from the emitter 2.

Figure 13:
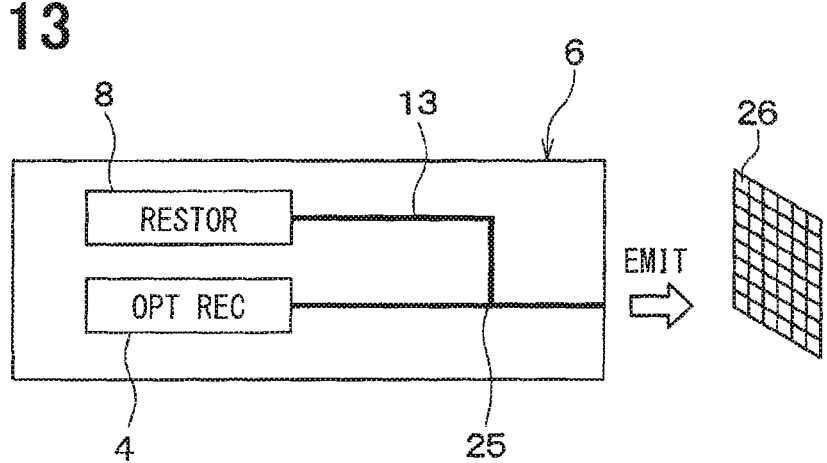
FIG. 13 illustrates a method for recognizing the mode of the received light.

The processor 5 identifies the emitter 2, which emits the light beam, based on the mode of the light beam received at the optical receiver 4. In particular, the processor 5 according to the present embodiment is arranged outside the semiconductor substrate 6, and includes a plurality of PDs 26 aligned in an array manner as shown in FIG. 13. The light beams, which are respectively transmitted from the optical receiver 4 and the resonator 8, is combined at the optical multiplexer 25. Subsequently, the combined light beam is emitted from end surface of the semiconductor substrate 6 to illuminate the plurality of PDs 26. The processor 5 includes a plurality of TIAs 27 respectively for the plurality of PDs 26. The output current of each PD 26 is converted to a voltage signal through the TIA 27, and then the voltage signal is input to the calculator 28.

In a situation where (i) the PDs 26 in an inner peripheral portion of the array has a larger output compared with the PDs 26 in an outer peripheral portion of the array and (ii) there is one peak output for the entire PDs 26, the calculator 28 determines that the received light beam's mode is the fundamental mode.

In other words, the calculator 28 determines that the received light beam is a reflected light of the light beam emitted from the light source 1a. In a situation where (i) the PDs 26 in a central portion of the array has a smaller output and (ii) there are two output peaks at both sides of the central portion of the array, the calculator 28 determines that the received light beam's mode is the first-order mode. In other words, the calculator 28 determines that the received light beam is a reflected light of the light beam emitted from the light source 1b.

In this embodiment, the light source is identified based on the received light beam's mode. Therefore, an object can be detected even though the light sources 1a and 1b emit the light beams at the same time. Accordingly, the frame rate can further be enhanced. In addition, the light beam's mode is hardly to be changed by disturbance or heat. Therefore, the robustness of the distance measuring sensor can also be enhanced.

Sixth Embodiment

The following describes a sixth embodiment. The present embodiment refers to a modification of the configuration of the optical waveguide 20 as compared with the second embodiment. Other than that, the present embodiment is similar to the second embodiment. The following only describes the parts of the present embodiment different from the ones of the second embodiment.

Figure 14:
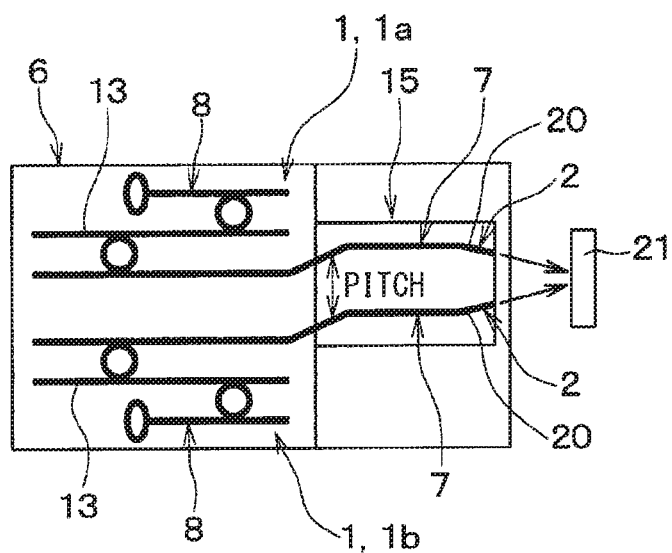
FIG. 14 is a plan view of a distance measuring sensor according to a sixth embodiment.

As shown in FIG. 14, with regard to a connecting part between the semiconductor substrate 6 and the chip 15 in the present embodiment, the two optical waveguides 20 are arranged to be parallel to each other; and the two optical waveguides 13 are arranged to be parallel to each other. It is noted that the two optical waveguides may be arranged to be substantially parallel to each other.

If the optical waveguides 13 are configured as described above, the distance between both of the optical waveguides 13, which may also be called as the pitch of the waveguide 13, can be maintained at the end surface of the semiconductor substrate 6 even though the etching position of the semiconductor substrate 6 for removing, for example, the active layer 11 is misaligned.

If the optical waveguides 20 are configured as described above, the distance between both of the optical waveguides 20 can be maintained at the end surface of the chip 15 even though the dicing position of the chip 15 is misaligned. Accordingly, the positional misalignment of the optical waveguides 13 and the optical waveguides 20 can be suppressed.

Seventh Embodiment

The following describes a seventh embodiment. The present embodiment refers to the addition of the SOA as compared with the sixth embodiment. Other than that, the present embodiment is similar to the sixth embodiment. The following describes only the parts different from the ones of the sixth embodiment.

Figure 15:
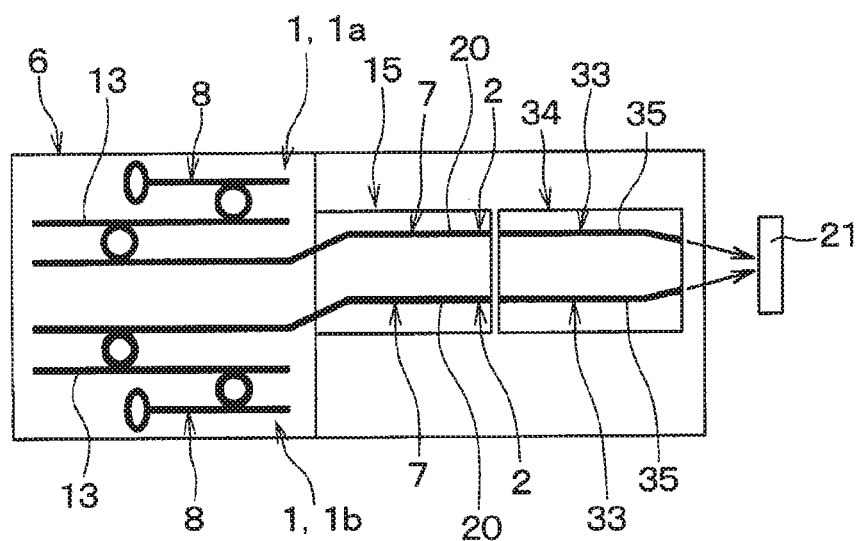
FIG. 15 is a plan view of a distance measuring sensor according to a seventh embodiment.

As shown in FIG. 15, the distance measuring sensor according to the present embodiment includes an SOA 33, which is different from the SOA 7. Two SOA 33 are provided in a chip 34, which has the same configuration as the chip 15. The chip 34 has two optical waveguides 35.

The chip 34 is arranged on the semiconductor substrate 6 so that the light beams respectively emitted from the two emitters 2 are incident on the two optical waveguides 35. The light beam generated by the light source 1 is amplified by the SOA 33 and then emitted.

If the light beam emitted by the emitter 2 is amplified by the SOA 33, it is possible to enlarge the output of the distance measuring sensor. For suppressing the reflection occurred at the end surface of the chip 34, it is beneficial to arrange anti-reflective coating, for example, a reflection preventing film, at the end surface of the chip 34.

Eighth Embodiment

The following describes an eighth embodiment. The present embodiment refers to the modification of the position of the emitter 2 as compared with the first embodiment. Other than that, the present embodiment is similar to the first embodiment. The following describes only the parts different from the ones of the first embodiment.

Figure 16:
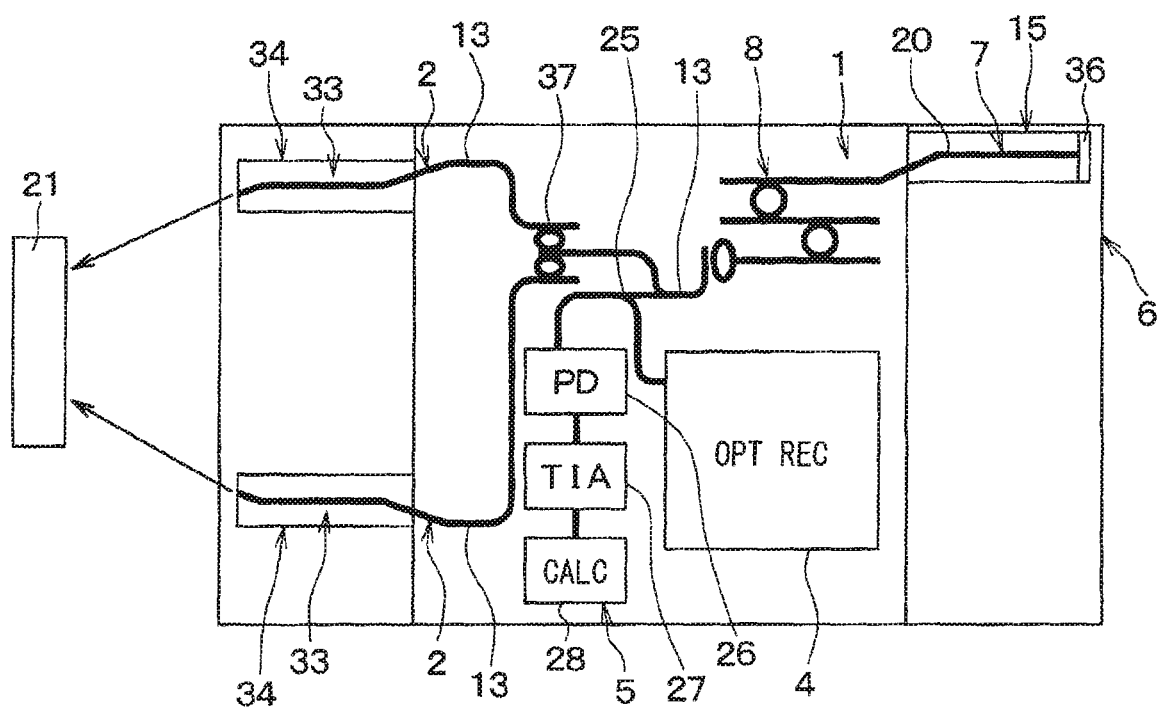
FIG. 16 is a plan view of a distance measuring sensor according to an eighth embodiment.

As illustrated in FIG. 16, the distance measuring sensor according to the present embodiment includes one light source 1, one optical receiver 4 and one processor 5. The distance measuring sensor includes a total-reflection mirror 36. The total reflection mirror 36 at the end surface of the chip 15, which is at a side opposite to the resonator 8. The light beam generated by the SOA 7 is incident on the optical waveguide 13 from the optical waveguide 20, and the bandwidth of the light beam is adjusted by the resonator 8.

An optical switch 37 is arranged at the semiconductor substrate 6. The optical waveguide is connected to the resonator 8 and the optical multiplexer 25. The optical waveguide 13 is split into branches, and one of the branches is connected to the optical switch 37. The two optical waveguides 13 are connected to the optical switch 37. The two optical waveguides 13 are extended to the end surface of the semiconductor substrate 6. The emitter 2 is configured by the optical waveguides 13, which is connected to the resonator 8, the optical switch 37 and the end surface of the semiconductor substrate 6.

The distance measuring sensor includes two chips 34 where the SOA 33 is arranged. The two chips 34 are arranged at the semiconductor substrate 6. The two chips 34 are configured to allow a light beam emitted from the emitter 2 to be incident on the optical waveguide 35.

Typically, the width of the semiconductor substrate 6 is wider than the width of the chip 15. When the two emitters 2 are arranged at the semiconductor substrate 6, the distance between the two emitters 2 can be enlarged. Accordingly, the miniaturization of an optical system is possible.

When the light beam is emitted from the optical waveguide 13 of the semiconductor substrate 6, it is beneficial to configure the optical waveguide 13 made of SiN or doped with SiOx such as SiO2 for higher luminance which is required in LIDAR. SiN has a higher band gap as compared with Si, and does not have two-photon absorption.

Other Embodiments

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

For example, the above-mentioned first to eighth embodiments may also be applied to Time of Flight (hereinafter referred to as "TOF") sensors. The TOF sensor is configured to measure the distance to an object by measuring a pulsed light's round trip time. When the first embodiment is applied to the TOF distance measuring sensors, for example, the operation of pulsed light emission from the light source 1*a* once or twice and the operation of pulsed light emission from the light source 1*b* once or twice are alternately carried out. When the third embodiment is applied to the TOF distance measuring sensors, the PD 25 with high frequency dependence is utilized.

The distance measuring sensor may have three or more light sources 1. The distance measuring sensor may have three or more emitters 2. In this situation, when the light beams respectively emitted from the plurality of emitters 2 having different light-emitting time durations, frequencies and modes, the optical receiver 4 can identify the light source based on the light reception time, the received light beam's frequency and its mode.

What is claimed is:

1. A distance measuring sensor configured to measure a distance to an object with light transmission and light reception, the distance measuring sensor comprising:
 a light source including
  a semiconductor optical amplifier at a semiconductor substrate, and
  a resonator having a silicon photonic circuit at the semiconductor substrate;
 a plurality of emitters, each emitter configured to emit a light beam generated by the light source to outside of the light source;
 a scanner configured to perform scanning with the light beam by
  enabling the light beam emitted from the emitter to be reflected at a mirror, and
  vibrating the mirror;
 an optical receiver configured to receive a reflected light beam, which is generated by the light beam reflected at the object;
 a processor configured to measure the distance to the object based on the reflected light beam received at the optical receiver; and
 a chip provided with a plurality of optical amplifiers,
 wherein the light beams respectively emitted from the emitters are incident on the mirror in different directions,
 wherein the scanner performs scanning different regions with the respective light beams,
 wherein the plurality of emitters are respectively configured by a plurality of optical waveguides at the chip,
 wherein the optical waveguides are referred to as chip-side optical waveguides,
 wherein the semiconductor substrate has one or more substrate-side waveguides,
 wherein each of the substrate-side optical waveguides is configured to emit a light beam from the resonator to the chip,
 wherein the semiconductor substrate and the chip are arranged such that light beams, which are respectively emitted from the substrate-side optical waveguides, are incident on the chip-side optical waveguides correspondingly,
 wherein the chip-side optical waveguides are parallel to each other at a connection part between the semiconductor substrate and the chip, and
 wherein the substrate-side optical waveguides are parallel to each other at the connection part between the semiconductor substrate and the chip.

2. The distance measuring sensor according to claim 1, further comprising:
 a plurality of chips, each chip provided with the semiconductor optical amplifier,
 wherein each emitter is configured by an optical waveguide at each chip.

3. The distance measuring sensor according to claim 1, wherein each of the emitters is configured by an optical waveguide, which is connected between the resonator and an end surface of the semiconductor substrate.

4. The distance measuring sensor according to claim 1, wherein the light beams respectively emitted from the emitters are different in light emission times.

5. The distance measuring sensor according to claim 4, wherein the processor is configured to identify the emitters based on the light emission times during which the optical receiver receives the respective light beams.

6. The distance measuring sensor according to claim 1, wherein the light beams respectively emitted from the emitters are different in directions of polarization.

7. The distance measuring sensor according to claim 6, wherein the processor is configured to identify the emitters based on the respective directions of polarization of the light beams received at the optical receiver.

8. The distance measuring sensor according to claim 1, wherein the light beams respectively emitted from the emitters are different in light modes.

9. The distance measuring sensor according to claim 8, wherein the processor is configured to identify the emitters based on the respective light modes of the light beams received at the optical receiver.

10. The distance measuring sensor according to claim 1, wherein the processor is configured to measure the distance to the object and a speed of the object with a frequency modulated continuous wave.

11. The distance measuring sensor according to claim 1, wherein the light beams respectively emitted from the emitters are different in frequencies, and
wherein the processor is configured to measure the distance to the object and a speed of the object with a frequency modulated continuous wave.

12. The distance measuring sensor according to claim 11, wherein the processor is configured to identify the emitters based on the respective frequencies of the light beams received at the optical receiver.

13. The distance measuring sensor according to claim 1, further comprising:
an additional semiconductor optical amplifier configured to amplify the light beams respectively emitted from the emitters.

\* \* \* \* \*